United States Patent [19]

Schubring

[11] Patent Number: 4,541,729
[45] Date of Patent: Sep. 17, 1985

[54] MICROWAVE HEATING CONTROL AND CALORIMETRIC ANALYSIS

[75] Inventor: Norman W. Schubring, Troy, Mich.

[73] Assignee: General Motors Corporation, Detroit, Mich.

[21] Appl. No.: 545,469

[22] Filed: Oct. 26, 1983

Related U.S. Application Data

[62] Division of Ser. No. 338,636, Jan. 11, 1982, Pat. No. 4,434,342.

[51] Int. Cl.$^4$ ............................................. G01K 17/00
[52] U.S. Cl. ........................................ 374/31; 374/33; 374/43
[58] Field of Search ................. 374/31, 142, 149, 43, 374/122, 33, 21, 101; 219/10.55 B; 324/58.5 R, 58.5 A, 58.5 B, 58.5 C; 34/1, 89; 426/241

[56] References Cited

U.S. PATENT DOCUMENTS 4,210,795 6/1980 Lentz ........................... 219/10.55 B

OTHER PUBLICATIONS

Walker, Huizinga, Voss and Tinga, "A System for Controlled Microwave Heating of Small Samples", Mar. 1976, J. of Microwave Power, vol. 11, No. 1, pp. 29–32.

Primary Examiner—Charles Frankfort
Assistant Examiner—Thomas B. Will
Attorney, Agent, or Firm—George A. Grove

[57] ABSTRACT

In accordance with a preferred embodiment, calorimetric properties of a microwave heatable work load are obtained while the load is being heated by producing electrical signals indicative of the net applied microwave power and the temperature of the material, and using the signals to produce a signal indicative of the net energy, or the specific heat, or the reflection coefficient of the work load as a function of its temperature.

5 Claims, 6 Drawing Figures

MICROWAVE HEATING CONTROL AND CALORIMETRIC ANALYSIS

This is a Division of copending U. S. Ser. No. 338,636, filed Jan. 11, 1982 now U.S. Pat. No. 4,434,342.

This invention relates to microwave heat treatment and calorimetric evaluation of materials such as, for example, ceramic formulations. More specifically, this invention relates to a method of controlling microwave heating on industrial size work loads to produce a desired heating rate or heating cycle in the work load. In an alternative practice this invention may be used to detect and analyze calorimetric properties of a work load, such as those properties sometimes now determined in a laboratory using differential thermal analysis.

BACKGROUND OF THE INVENTION

Microwaves occupy a region in the electromagnetic spectrum between radio waves on the side of lower frequency and infrared waves on the side of higher frequency. While there may be no definite boundary between these regions, electromagnetic radiation having frequencies in the range of $10^9$ Hz to $10^{11}$ Hz are normally termed microwaves. Such radiation has wavelengths in the range of about one millimeter to one decimeter. Two specific frequencies —915 MHz and 2450 MHz—have been designated for domestic and industrial heating application.

It is known that such radiation of sufficient intensity will heat compositions that have a suitable relative permittivity, $\epsilon_r$, and dissipation factor, D. The heating effect is induced within the material. The heat does not have to be conducted to and into the material as occurs by radiant or convective heating in a gas-fired or electric oven, furnace or kiln. Consequently, the total energy consumption is reduced because there is less time during which reradiation losses can occur. For this reason microwave heating, where applicable, offers an energy efficient means of carrying out operations such as drying, baking, resin curing, calcining, sintering and the like. The development of economical, efficient and reliable continuous wave microwave generators, such as the klystron and magnetron, have made microwave heating practical.

A potential application for microwave heating is in the sintering of alumina spark plug insulator bodies. In the green (unsintered) state these bodies are a compacted blend of several inorganic powders—(mostly alumina, $Al_2O_3$) and several organic binders—mostly wax. Millions of these hollow, round, elongated bodies of familiar shape are sintered each work day in large gas-fired kilns. Batches of thousands of the bodies are slowly heated from room temperature to about 2900° F. (1593° C.), soaked at that temperature and then slowly cooled. During this long cycle (about 24 hours) the bodies are dried, the wax burned out and the residual ceramic powder sintered into strong unitary bodies. This venerable practice consumes much natural gas, and requires large furnaces and much floor space.

Microwave heating can improve the efficiency of sintering of such ceramic workpieces in all of the above aspects. However, I have found that close control must be had over the rate of introduction of microwave energy into the work load to best realize these advantages. The application of too much microwave power can, e.g., accelerate inherent exothermic chemical reactions in the work load material, causing the temperature to shoot up over the ultimate desired level and possibly inflict damage to equipment and produce unacceptable products. If the energy is applied at too low a rate to avoid such problems, the potential benefit of the microwave heating is not fully realized.

OBJECTS OF THE INVENTION

It is an object of my invention to provide a method of controlling the rate of application of microwave energy to a work load to be heated so as to achieve, even on a large industrial batch, a desired heating rate or heating profile that efficiently produces a quality product. My method involves monitoring, preferably continuously using electrical devices, both the temperature of the work load as it is heated and the net microwave power introduced. These parameters are readily measured continuously and concurrently, and I have provided a manner of using them to judiciously and effectively carry out microwave heating. My practice has been developed in connection with sintering alumina spark plug bodies, but it is also an object of my invention to provide a method of controlling the heating of other materials that can be heated by microwaves.

It is also an object of my invention to provide a method utilizing microwave energy and applicable to an industrial size furnace or kiln to determine in real time calorimetric or thermochemical properties of a work load in the furnace. These properties obtained on an actual work load can be used to plan or execute an optimum heat treatment of the work load.

BRIEF SUMMARY OF THE INVENTION

These and other objects and advantages of my invention may be accomplished as follows. A load of material heatable by microwave radiation is loaded in a microwave oven or kiln. An example of a suitable material is green alumina-based spark plug insulator bodies. A suitable heating apparatus is a chamber having metal walls lined with an insulation material that is transparent to microwaves but opaque to infrared radiation.

Microwave radiation is transmitted to the work load from a suitable microwave source (for example, a magnetron) through a microwave waveguide that leads to the kiln. A thermocouple or other suitable thermoelectric temperature sensing device is positioned within the heating cavity of the kiln closely adjacent the work load. Situated in the waveguide are microwave power detecting devices for producing a voltage indicative respectively of the microwave power directed forwardly from the microwave source to the heating cavity (forward power, $P_F$) and the microwave power flowing in the reverse direction that is reflected from the heating cavity (reflected power, $P_R$). Such microwave power sensing devices are known. For example, two directional couplers arranged in opposition are inserted in the waveguides to sample, respectively, the forward and reflected power. A crystal detector is employed in each coupler to indicate the power level.

Initially the microwave generator is operated at a predetermined power level. The forward power level and the reflected power level are detected, and signals indicative of their levels are processed in an analog device, an operational amplifier, that sums these input signals to produce a signal indicative of the net microwave power directed into the heating cavity. It will be appreciated that this net microwave power signal is also the instantaneous derivative of microwave energy with time (dE/dt).

In addition to continuously monitoring the net microwave power applied to the heating cavity, the temperature of the work load is monitored by the temperature indicative voltage output of a thermocouple or other pyrometer. Obviously, this voltage can be used to continuously record the temperature of the work load. It is also processed through an analog differentiation circuit to obtain a voltage indicative of the differential of the temperature of the work load with time (dT/dt). The voltage signal indicative of net power is divided in an analog circuit by the signal indicative of dT/dt to produce a signal indicative of the differential dE/dT. It will be appreciated that this signal is, in effect, a measure of the instantaneous heat capacity of the load. It is a measure of the amount of microwave energy actually used to increase the temperature of the load one increment of temperature at that moment. This value may, of course, be plotted by a recorder to provide a record of the heat capacity of the work load with temperature. In accordance with a preferred practice of my invention, however, this signal is used to directly control the power output of the microwave source.

By controlling the microwave output of the source with a feedback signal indicative of the heat capacity of the work load I am able to supply the work load with just that quantity of microwave energy required to increase the temperature of the work load in a straight line temperature-time relationship. In the event a heating rate or heating mode other than a straight line temperature-time relationship is desired, the dE/dT signal may be compared with the desired heating mode and control of the microwave power source thereby obtained. Thus, by so monitoring the work load temperature and net microwave power applied to the work load and using voltage signals as described I am able to precisely control the heat treatment of a microwave responsive material.

It also will be appreciated that one need not use the signals to control the heating but can record them to obtain useful calorimetric or thermochemical properties of an industrial sized work load. Knowledge of these properties can be used to plan or develop a heat treatment practice best suited to the properties of the material to be processed.

Further advantages of my invention will become more apparent from a detailed description of the invention which follows. Reference will be made to the drawings in which.

Figure 1:
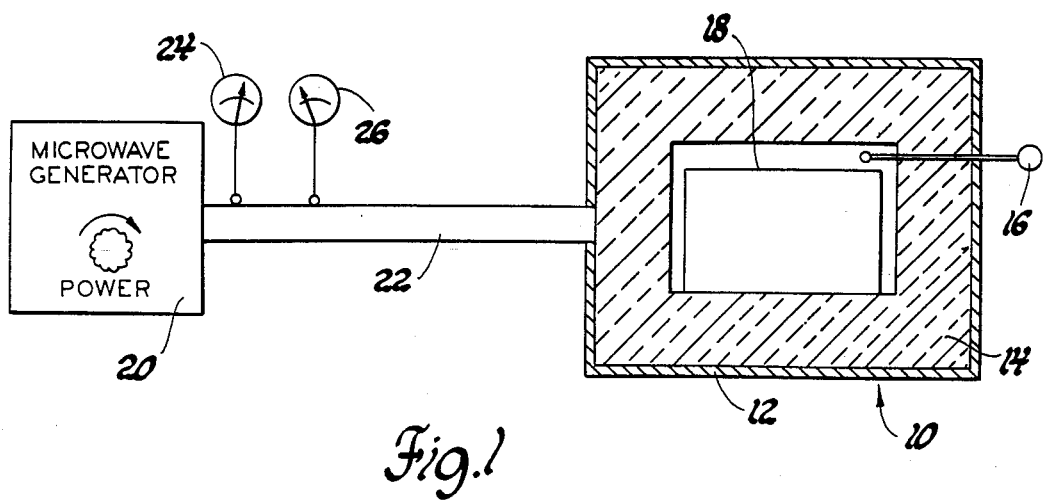
FIG. 1 is a schematic representation of apparatus used in carrying out the subject method.

FIG. 1 illustrates microwave heating apparatus as used in the practice of this invention. A kiln 10 is provided of suitable size and shape to process the selected work load. The kiln will typically have a metal shell 12 that is provided with an insulative lining 14. The lining is substantially transparent to microwaves but opaque to infrared radiation generated by the work load as it is heated by microwaves. A suitable material is Babcock-Wilcox 3000 millboard which is rated to withstand 3000° F. (1649° C.). The interior of the oven can be constructed of a double layer of one inch thick millboard, with all edges staggered to preclude line-of-sight infrared paths. The millboard walls or box that defines the interior of the furnace is surrounded on all six sides by a three inch thickness of Babcock-Wilcox 2600 Kaowool ® flexible blanket which is rated stable to 2600° F. (1266° C.). Both insulative layers are basically high purity alumina. A thermocouple 16 is inserted through the wall of the kiln and extending into the interior of the kiln closely adjacent the load 18 of workpieces to be heated.

In accordance with my invention the work load may be any composition having suitable properties of relative permittivity, $\epsilon_r$, and dissipation factor, D, such that the material will be heated when subjected to microwave radiation of sufficient power. An example of such a material is spark plug insulator bodies in the green state. These bodies are a compressed blend of inorganic powders, mostly alumina, and organic binders, mostly wax. An $\epsilon_r$ of 9 and D of 0.0006 are probable values for the alumina spark plug insulator bodies.

A suitable microwave generator, such as a magnetron, capable of producing microwave energy at a frequency of 2450 MHz and a suitable power level is illustrated at 20. The power output of the generator should be controllable. The microwave energy is conducted from the microwave generator through a suitable waveguide 22 to the oven 10. The waveguide is provided with a suitable detection device 24 capable of measuring microwave power ($P_F$) transmitted from the generator to the oven. A second device 26 is provided for measuring microwave power ($P_R$) reflected from the oven back toward the microwave generator. Such microwave detection devices are readily available. They are directionally responsive and generate a voltage indicative of the microwave power incident to them in the direction of their sensitivity.

When alumina spark plug insulator bodies are sintered in a gas-fired kiln they are slowly heated from room temperature to about 2900° F. over a period of several hours. The heating rate is slow because heat must be conducted from the surface of each body to its interior. The bodies are maintained at about 2925° F. for an hour or so, and then cooled. The cycle takes twenty-four hours and consumes much natural gas.

Microwave heating is much faster because the heat is produced inside the workpiece. Overheating, or other problems, can result if the calorimetric properties of the work load are not fairly well known. For example, when green alumina spark plug bodies are rapidly heated to a temperature of about 600° to 700° F., an exothermic reaction occurs. The reaction is believed to be the combustion of the wax binder materials. If allowance is not made for the exothermic process, the indiscriminate application of microwave energy can produce an uncontrollable rapid temperature increase.

A very satisfactory way of heating such a material is to determine the variation of specific heat with temperature of the work load. This can be estimated by conducting a differential thermal analysis (DTA) on a small sample. I prefer to make such a determination on each work load using data on the absorbed microwave energy and temperature of the load. By controlling the microwave power to the instantaneous heat requirements of the load, the efficiency of the process is increased but overheating is avoided.

Figure 2:
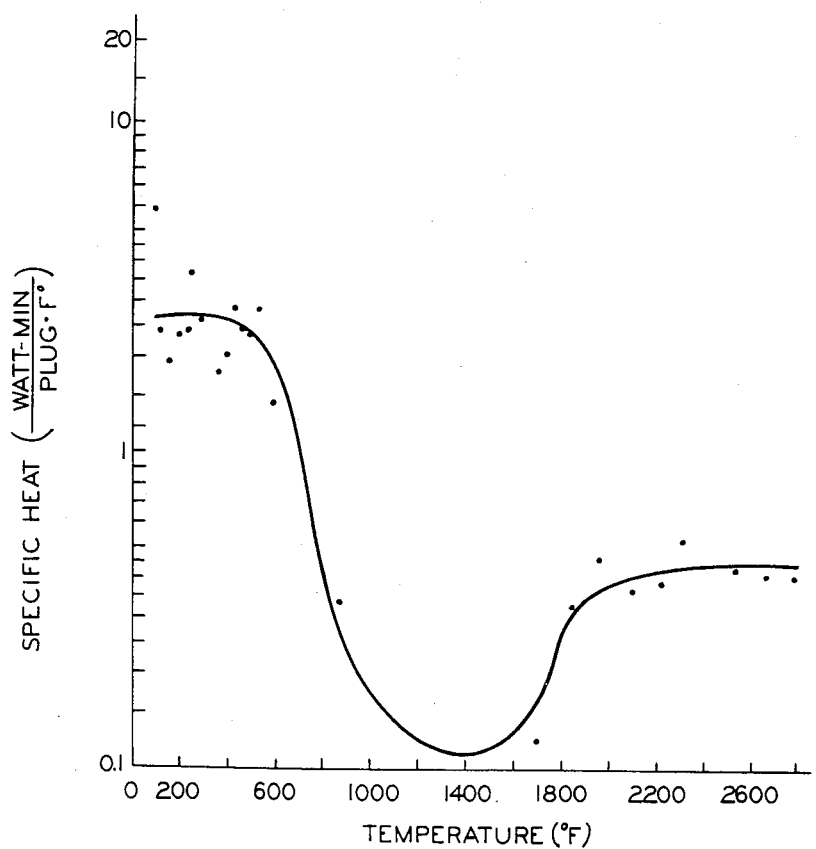
FIG. 2 is a graphical representation of a specific heat versus temperature curve for the sintering of a ceramic material such as alumina spark plug insulator bodies.

FIG. 2 shows a representative relationship between the effective specific heat of a spark plug insulator work load and its temperature. It is seen that the value of the specific heat of the work load is at a fairly constant high level in the temperature range from room temperature to about 500° F. From 500° to 1400° F. the specific heat requirement decreases dramatically as a consequence of the exothermic reaction induced within the work load itself. From temperatures of 1400° F. to about 2100° to 2200° F. the specific heat increases to an intermediate value at which it levels off for the remainder of the sintering operation.

Figure 3:
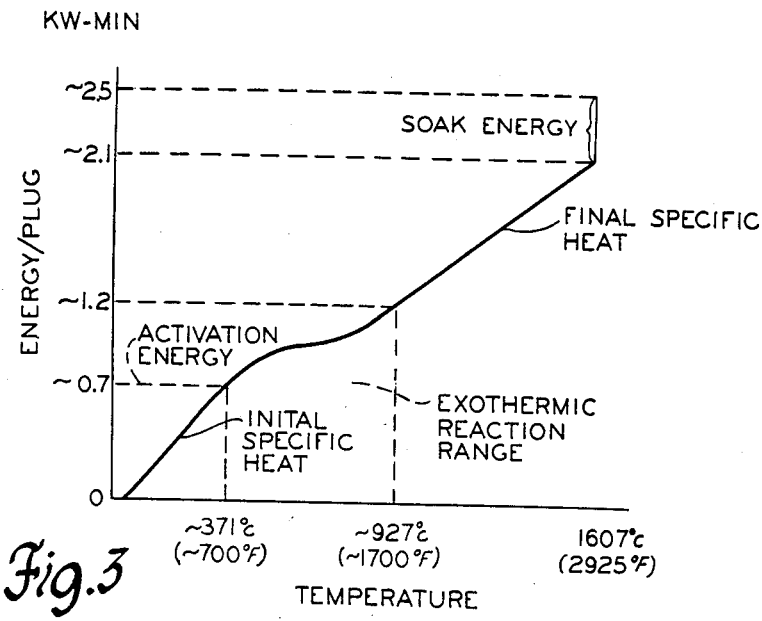
FIG. 3 is a plot of total energy versus temperature during the heating of such a work load.

FIG. 3 is a plot of the total energy from an external source necessary to be applied to the work load during the sintering operation. This plot is predictable from the specific heat data of FIG. 2. The total energy increases in a straight line relationship with temperature until the exothermic reaction region is reached. There the energy requirement drops off until the reaction is done. Thereafter, the energy increases again to the soaking temperature.

Figure 4:
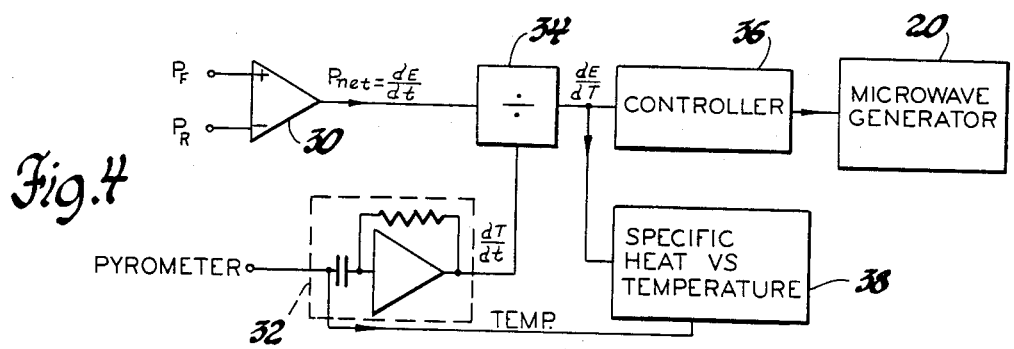
FIGS. 4–6 are schematic representations of electrical analog control circuits useful in the practice of my invention.

Depicted in FIG. 4 is an electrical circuit providing an analog feedback control to a microwave generator to produce an energy input precisely equivalent to the specific heat of the load at its current temperature. As indicated to the left of the Figure, the input signals to the circuit are the forward microwave power, $P_F$ (from device 24), the reflected microwave power, $P_R$ (from device 26), and the temperature (from thermocouple or pyrometer 16). These inputs are all voltages indicative of the respective values that are being monitored and they are continuously produced during the heating operation. The elements of the circuit which will be described in terms of their function are all known and commercially available electrical components recognizable by those skilled in the art of analog control circuits.

The $P_F$ and $P_R$ signals are fed to an operational amplifier summer device 30. The output of summer 30 is a voltage indicative of the instantaneous net power input, $P_{net}$, to oven 10. Of course, it will also be recognized that $P_{net}$ is equivalent to the differential of the net energy being supplied with time (dE/dt). At the same time, the temperature indicative voltage value from the pyrometer 16 is fed to a differentiator circuit element 32 that produces a voltage signal proportional to the instantaneous rate of change of temperature with time (dT/dt). The two differential indicative signals (i.e., dE/dt and dT/dt) are fed to a divider circuit element 34. The output of this circuit element is a voltage signal indicative of the differential of energy with temperature (dE/dT) which is, in effect, the instantaneous heat capacity of the work load in oven 10.

This signal indicative of dE/dT is supplied to controller 36. In this example the controller 36 is a positioning motor-driven Variac ® electrical control that adjusts the power output of the microwave generator. The position of the motor is determined by the dE/dT indicative signal. The position of the motor adjusts the Variac ®. Thus, given an initial power setting of the generator, its output can be continually controlled by the apparatus and circuit in FIG. 4 to match the specific heat of the work load. This will normally produce a substantially straight-line increase in temperature of the work load with time.

Also as depicted in FIG. 4, the temperature signal from the pyrometer and the signal indicative of dE/dT may both be fed to a recorder 38 which will record the specific heat versus temperature of the work load.

The above-described method and electrical circuit utilized voltage signals indicative of the net microwave power supplied to an oven and the instantaneous temperature of the work load to match the applied net power to the specific heat of the work load. Such heating mode is considered desirable in rapidly and efficiently using microwave energy to produce quality sintered ceramic workpieces. However, it will be appreciated that depending upon the thermal properties of a microwave heatable work load, other heating cycles or modes might be preferred. Once the preferred mode or cycle is selected, such cycle may be used as a template or model, against which the output of the divider 34 in the circuit FIG. 4 may be compared. In other words, a voltage signal indicative of the instantaneous heat capacity of a production size work load may be compared with a model of the desired heating cycle and such comparison used to control the microwave input to produce such a heating cycle.

It will also be appreciated that the use of the net instantaneous power input to the microwave heating oven and the temperature may be employed to obtain useful calorimetric or thermochemical data in real time on a production size work load. The method and electrical circuit depicted in FIG. 4 will determine the specific heat of the work load versus temperature. This provides a means of obtaining quickly on a large scale work load data of the type obtainable on small samples by differential thermal analysis.

Figure 5:
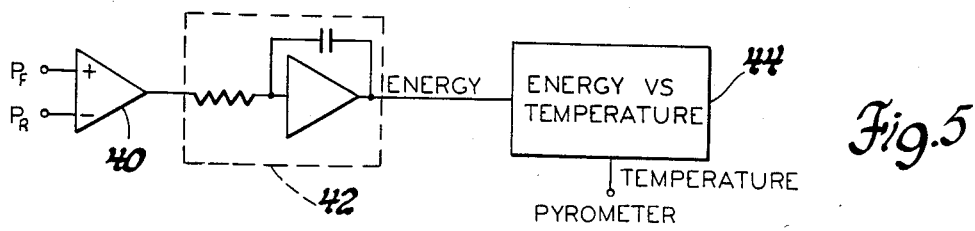

FIG. 5 illustrates another electrical circuit using conventional electrical circuit elements to measure and record the energy input to a work load with temperature change. Again, $P_F$ and $P_R$ signals are fed to a summer 40 to produce a signal indicative of the instantaneous net power supplied to a microwave heating oven. The instantaneous power signal is fed to an integrator circuit element 42 which produces a signal indicative of the energy theretofore supplied to the oven. The signal indicative of energy and a voltage signal indicative of temperature may be simultaneously supplied to a recorder 44 to produce a graph of total energy versus temperature.

In another example it may be desired to provide a record of the reflection coefficient versus temperature of a microwave heating situation. The ratio of the reflected power to the forward power is equivalent to the square of the absolute value of the reflection coefficient, $P_R/P_F = |\Gamma|^2$.

Figure 6:
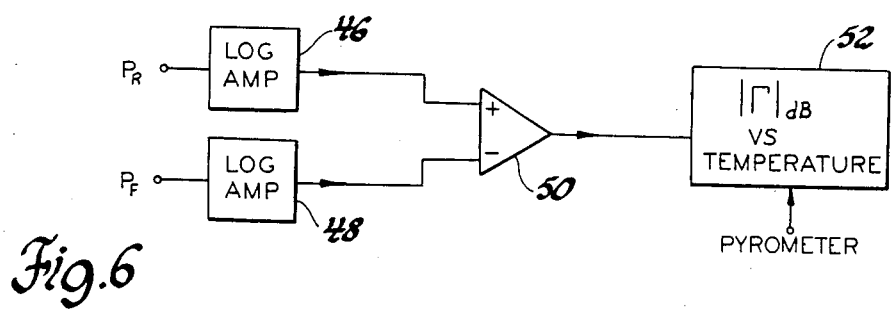

FIG. 6 depicts an electrical circuit of known electrical components that will produce a record of the reflective coefficient versus temperature in real time for an actual microwave heating situation. Signals indicative of $P_R$ and $P_F$ are respectively fed to log amplifiers 46 and 48. The output signals indicative of the log of $P_R$ and log $P_F$ are fed to a summer 50 which produces an output signal indicative of two log $|\Gamma|$ which in turn is a measure of the reflection coefficient in decibels, $|\Gamma|$ dB. If this signal and a temperature indicative signal are fed to a recorder 52, a graph of reflection coefficient versus temperature is produced. This serves to indicate the susceptibility of the work load to microwave absorption as a function of temperature.

Thus, I have provided a method using voltage signals indicative of instantaneous net power input and instantaneous temperature with respect to a microwave heated work load to both provide valuable calorimetric or thermochemical information concerning the work load and to control the heating cycle or heating mode of the work load. While the practice of my invention has been described in terms of heating ceramic spark plug insulator bodies, it will be appreciated that the method is useful in heat treating any material susceptible to being heated by microwave energy. Accordingly, the scope of my invention is to be considered limited only by the scope of the following claims.

The embodiments of the invention in which an exclusive property or privilege is claimed are defined as follows:

1. A method of using microwave energy to obtain calorimetric data on a work load that is heatable with microwaves, comprising
    subjecting a load of such material to microwave energy while the material is situated in a cavity receptive to the microwave energy and retentive of radiation from the heated load, said microwave energy being generated at a source remote from said cavity and conducted to the cavity through a suitable microwave waveguide,
    producing an electrical signal indicative of the temperature of the load in said cavity while it is being heated with said microwave energy,
    monitoring microwave power transmitted through the waveguide from said source to the cavity and microwave power reflected from the cavity back through the waveguide toward the source while the load is being heated by said microwave energy and producing electrical signals indicative of said microwave power levels, and
    processing said temperature indicative signal and said microwave power level signals by electrical analog circuit to obtain a signal indicative of the microwave energy input to the heated work load as a function of the temperature of the work load which is an indication of calorimetric data of the work load while it is being heated by said microwave energy.

2. A method of using microwave energy to obtain calorimetric data on a work load that is heatable with microwaves, comprising
    subjecting a load of such material to microwave energy while the material is situated in a cavity receptive to the microwave energy and retentive of radiation from the heated load, said microwave energy being generated at a source remote from said cavity and conducted to the cavity through a suitable microwave waveguide,
    producing an electrical signal indicative of the temperature of the load in said cavity while it is being heated with said microwave energy,
    monitoring microwave power transmitted through the waveguide from said source to the cavity and microwave power reflected from the cavity back through the waveguide toward the source while the load is being heated by said microwave energy and producing electrical signals indicative of said microwave power levels, and
    processing said temperature indicative signal and said microwave power level signals by electrical analog circuit to obtain a signal indicative of the reflection coefficient of the heated work load as a function of its temperature which is indication of calorimetric data of the work load while it is being heated by said microwave energy.

3. A method of using microwave energy to obtain specific heat data on a work load that is heatable with microwaves, comprising
    subjecting a load of such material to microwave energy while the material is situated in a cavity receptive to the microwave energy and retentive of radiation from the heated load, said microwave energy being generated at a source remote from said cavity and conducted to the cavity through a suitable microwave waveguide,
    continually producing a voltage indicative of the temperature of the load in said cavity while it is being heated with said microwave energy,
    monitoring microwave power transmitted through the waveguide from said source to the cavity and microwave power reflected from the cavity back through the waveguide toward the source while the load is being heated by said microwave energy and continually producing a voltage indicative of the net microwave power absorbed by said load, and
    continually producing a voltage indicative of the rate of change of said applied power to the heated work load with temperature using said temperature indicative voltage and said net power indicative voltage which is an indication of specific heat data of the work load while it is being heated by said microwave energy.

4. A method of using microwave energy to obtain specific heat data on a work load that is heatable with microwaves, comprising
    subjecting a load of such material to microwave energy while the material is situated in a cavity receptive to the microwave energy and retentive of radiation from the heated load, said microwave energy being generated at a source remote from said cavity and conducted to the cavity through a suitable microwave waveguide,
    continually producing a voltage indicative of the temperature of the load in said cavity while it is being heated with said microwave energy,
    monitoring the microwave power transmitted through the waveguide from said source to the cavity and microwave power reflected from the cavity back through the waveguide toward the source while the load is being heated by said microwave energy, and continually producing a voltage indicative of the net microwave power absorbed by said load, and
    continually producing a voltage indicative of the net energy input to the heated work load as a function of its temperature using said temperature indicative voltage and said net power indicative voltage which is at indication of specific heat data of the work load while it is being heated by said microwave energy.

5. A method of using microwave energy to obtain specific heat data on a work load that is heatable with microwaves, comprising
    subjecting a load of such material to microwave energy while the material is situated in a cavity receptive to the microwave energy and retentive of radiation from the heated load said microwave energy being generated at a source remote from said cavity and conducted to the cavity through a suitable microwave waveguide,
    continually producing a voltage indicative of the temperature of the load in said cavity while it is being heated with said microwave energy,
    monitoring microwave power transmitted through the waveguide from said source to the cavity and microwave power reflected from the cavity back through the waveguide toward the source while the load is being heated by said microwave energy and continually producing a voltage indicative of the net microwave power absorbed by said load, and continually producing a voltage indicative of the specific heat of the heated work load as a function of its temperature using said temperature indicative voltage and said net power indicative voltage.

* * * * *

UNITED STATES PATENT AND TRADEMARK OFFICE
CERTIFICATE OF CORRECTION

PATENT NO. : 4,541,729

DATED : September 17, 1985

INVENTOR(S) : Norman W. Schubring

It is certified that error appears in the above-identified patent and that said Letters Patent is hereby corrected as shown below:

Column 8, line 37, after "monitoring" delete "the".

Column 8, line 58, after "load" insert -- , -- (a comma).

Signed and Sealed this

Twenty-second Day of April 1986

[SEAL]

Attest:

DONALD J. QUIGG

Attesting Officer

Commissioner of Patents and Trademarks